UNITED STATES PATENT OFFICE.

LEWIS McDANIEL, OF TABOR, IOWA.

EXPLOSIVE.

SPECIFICATION forming part of Letters Patent No. 717,441, dated December 30, 1902.

Application filed November 27, 1901. Serial No. 83,922. (No specimens.)

*To all whom it may concern:*

Be it known that I, LEWIS MCDANIEL, a citizen of the United States, residing at Tabor, in the county of Fremont and State of Iowa, have invented certain new and useful Improvements in Explosives; and I do declare the following to be a full, clear, and exact description of the invention, such as will enable others skilled in the art to which it appertains to make and use the same.

The invention relates to explosives, and more particularly to a smokeless powder.

The object of the invention is to provide a smokeless powder which will be cheap of production, which will have no corroding effect, and which will possess a high degree of penetration.

The basic constituents of my powder, are chlorate of potash, powdered sugar, and saltpeter.

In compounding the powder, a suitable amount of coloring-matter—for instance, one ounce of diamond dye of yellow or straw color—is dissolved in one pint of water and then thoroughly mixed with sixteen ounces of powdered sugar of commercial grade. After the mixture of coloring-matter and sugar is thoroughly dissolved, to it are added sixteen ounces of chlorate of potash and two ounces of common saltpeter, which are thoroughly stirred and mixed until a granulated powder is produced.

When the granulated powder is dry, it is placed in a revolving cylinder, and to it is added two ounces of common gasolene for the purpose of hardening and polishing the grain of the powder.

What I claim is—

The process of making a smokeless powder consisting of dissolving sugar in water to form a syrup, incorporating chlorate of potash and saltpeter, stirring and mixing the same until a granulated powder is produced, and subjecting the powder to agitation in the presence of gasolene, substantially as and for the purpose set forth.

In testimony whereof I have hereunto set my hand in presence of two subscribing witnesses.

LEWIS McDANIEL.

Witnesses:
U. G. MAUK,
A. A. FAILING.